(12) United States Patent
Commaret et al.

(10) Patent No.: US 8,028,530 B2
(45) Date of Patent: Oct. 4, 2011

(54) DEVICE FOR ATTACHING A COMBUSTION CHAMBER

(75) Inventors: Patrice Andre Commaret, Rubelles (FR); Sylvain Duval, Tournan en Brie (FR); Didier Hippolyte Hernandez, Quiers (FR); Yann Francois Jean-Claude Vuillemenot, Paris (FR)

(73) Assignee: SNECMA, Paris (FR)

( * ) Notice: Subject to any disclaimer, the term of this patent is extended or adjusted under 35 U.S.C. 154(b) by 534 days.

(21) Appl. No.: 12/177,274

(22) Filed: Jul. 22, 2008

(65) Prior Publication Data
US 2010/0043449 A1 Feb. 25, 2010

(30) Foreign Application Priority Data
Jul. 26, 2007 (FR) .................... 07 05452

(51) Int. Cl.
*F02C 7/20* (2006.01)
*F23R 3/50* (2006.01)

(52) U.S. Cl. ................. 60/797; 60/800; 60/804
(58) Field of Classification Search ............. 60/800, 60/799, 797, 804
See application file for complete search history.

(56) References Cited

U.S. PATENT DOCUMENTS

| | | | |
|---|---|---|---|
| 2,510,645 A | 6/1950 | McMahan | |
| 3,006,587 A | 10/1961 | Jumelle et al. | |
| 3,007,308 A | 11/1961 | Rahaim et al. | |
| 3,481,146 A * | 12/1969 | Jackson et al. | 60/800 |
| 4,597,258 A | 7/1986 | Harris | |
| 5,088,279 A * | 2/1992 | MacGee | 60/796 |
| 6,442,946 B1 | 9/2002 | Kraft et al. | |
| 6,546,729 B2 * | 4/2003 | Hellat et al. | 60/725 |
| 7,024,863 B2 * | 4/2006 | Morenko | 60/800 |
| 2002/0184890 A1 * | 12/2002 | Camy et al. | 60/804 |

FOREIGN PATENT DOCUMENTS

| | | |
|---|---|---|
| DE | 43 40 530 A1 | 6/1995 |
| EP | 1 265 037 A1 | 12/2002 |
| EP | 1 777 460 A1 | 4/2007 |
| EP | 1 793 095 A1 | 6/2007 |
| FR | 1 551 357 | 12/1968 |
| FR | 2 686 683 | 7/1993 |
| GB | 2 115 877 A | 9/1983 |
| GB | 2 135 440 A | 8/1984 |
| GB | 2 242 483 A | 10/1991 |
| GB | 2 422 874 A | 8/2006 |

OTHER PUBLICATIONS

U.S. Appl. No. 12/190,105, filed Aug. 12, 2008, Commaret, et al.

* cited by examiner

*Primary Examiner* — Ted Kim
(74) *Attorney, Agent, or Firm* — Oblon, Spivak, McClelland, Maier & Neustadt, L.L.P.

(57) ABSTRACT

A turbomachine including an annular combustion chamber is disclosed. The combustion chamber includes a radially inner wall and a radially outer wall exhibiting symmetry of revolution. An annular chamber end wall equipped with a fuel injection device connects upstream ends of the inner and outer walls. A suspension device suspends the upstream end of the combustion chamber from an outer casing.

15 Claims, 3 Drawing Sheets

DEVICE FOR ATTACHING A COMBUSTION CHAMBER

BACKGROUND OF THE INVENTION

The present invention relates to a turbomachine, such as an airplane turbojet or turboprop, equipped with an annular combustion chamber.

A turbomachine annular combustion chamber comprises two, an inner and an outer, coaxial walls exhibiting symmetry of revolution, which are connected at their upstream ends by a rigid annular chamber end wall and at their downstream ends have flanges for attaching to inner and outer casings. It also comprises an upstream annular cowling fixed to the chamber end wall and intended to direct the air flow into or around the combustion chamber. The chamber end wall and the cowling have openings to allow air to enter the chamber and to allow for the insertion of injectors that spray fuel into the combustion chamber.

At the downstream end, the chamber is connected by the outer flange to an outer casing of a turbine section positioned on the outlet side of the combustion chamber.

The way in which this chamber is mounted in the inner and outer casings and the way in which it is attached present a certain number of disadvantages which degrade turbomachine performance.

Specifically, the injectors cannot be positioned relative to the chamber in the optimum way needed for good combustion because of the way in which the chamber is attached. Specifically, the successive fixings of the various parts of the chamber, namely the fixings of the inner and outer walls of revolution to the chamber end wall, then the attaching of the inner and outer flanges to the casings of the turbomachine, lead to a build-up in manufacturing and assembly tolerances of each of the parts and therefore to imprecision in the positioning of the chamber within the casings. As a result, the injectors cannot be attached accurately to the casing and their tips cannot be aligned accurately along the axis of the combustion chamber, which means that the fuel injected into the chamber cannot undergo ideal combustion and turbomachine performance is diminished.

DESCRIPTION OF THE PRIOR ART

In the prior art, a distinction is made between two types of combustion chamber according to whether the combustion chamber is divergent or convergent, that is to say according to whether, from the upstream and downstream, the chamber diverges from or converges toward the axis of the turbomachine.

The combustion chamber is generally mounted in the outer casing from the downstream end and this does not present any particular difficulty in the case of divergent chambers.

In some instances, convergent combustion chambers may be preferred over divergent chambers because they occupy a smaller amount of space in the axial direction. Mounting such chambers in the outer casing from the downstream end means that the downstream diameter of the outer casing of the chamber has to be increased, thus leading to an increase in the radial dimension, in the mass and in the cost. The increase in the downstream diameter of the casing also causes misalignment between the outer casing of the chamber and the outer casing of the turbine section, thus reducing aerodynamic performance. Finally, attaching the chamber from the upstream end in order to avoid the aforementioned problems might not be feasible because it would entail recourse to inner and outer flanges attached to the upstream part of the combustion chamber in the bypass flow, with points of attachment in the regions of attachment of the injectors, and this would create mechanical difficulties and problems with airflow around the chamber.

In operation, the difference in temperature between the chamber and the outer casing may also lead to the injectors being misaligned relative to the axis of the chamber as a result of axial expansion of the chamber which may be by as much as several millimeters.

SUMMARY OF THE INVENTION

The subject of the present invention is a turbomachine, particularly one with a convergent annular chamber, which avoids the aforementioned disadvantages of the prior art in a simple, effective and economical way.

To this end, it proposes a turbomachine comprising an annular combustion chamber comprising two, a radially inner and a radially outer, walls exhibiting symmetry of revolution, all with respect to the axis of the turbomachine, and which are connected at their upstream ends by an annular chamber end wall equipped with fuel-injection means, which turbomachine comprises suspension means for suspending the upstream end of the combustion chamber from an outer casing, these means comprising at least one link rod articulated at its ends to a wall of the combustion chamber and to the outer casing, the downstream end of the combustion chamber being connected to an inner casing or outer casing by flexible connections or mounts.

The chamber is suspended from the outer casing at the upstream end of the chamber, thus allowing the chamber to be mounted in the outer casing from the upstream end and avoiding having to increase the downstream diameter of the outer casing. Alignment of the outer casing of the chamber and of the outer casing of the turbine section improves the aerodynamic performance of the turbomachine. Suspending the chamber from its upstream end improves the position of its upstream part and therefore allows the tips of the injectors to be aligned precisely with the holes in the chamber end wall, thus optimizing the combustion of the fuel. The elimination of the flanges that connect the downstream part of the chamber to the outer and inner casings makes it possible to reduce the mass of the turbomachine.

This link rod can be incorporated perfectly into the mechanical surroundings of the injectors and of the upstream part of the combustion chamber and does not disrupt the airflow that flows around the combustion chamber. Connecting the chamber to the outer casing using one or more link rods makes it possible to eliminate the operational radial stresses that are applied to the chamber.

Advantageously, the link rod lies in a plane that passes through the axis of the turbomachine.

According to another feature of the invention, one end of the link rod is articulated to the upstream end of the outer wall of revolution, its other end being housed and articulated in an outwardly projecting boss belonging to the outer casing. Each end of the link rod is articulated about a transverse axis on a cylindrical pin mounted in holes in a clevis belonging to the outer wall of the chamber or of the outer casing, respectively.

The articulation between the link rod and the chamber is positioned at the upstream end of the outer wall of revolution because this part is cooler than the other parts of the chamber, making it possible to limit clevis deformation as the chamber heats up during operation and thus optimizing the position of the injectors relative to the chamber.

Guide bushings may be set into the holes in the clevises to ensure correct positioning of the pins in the clevises belonging to the outer wall of revolution and thus guaranteeing optimal positioning of the chamber on the outer casing.

According to another feature, the ends of the link rod are articulated on the cylindrical pins by means of ball swivels through which these pins pass.

Inserting fixed ball swivels into the clevises allows the pins to swivel in the clevises, thereby making it possible to compensate for any defects in the shape of the components and any shortcomings in the fitting of the chamber relative to the outer casing.

In a preferred embodiment of the invention, the combustion chamber comprises three link rods distributed over the upper half-circumference of the outer wall of the chamber, one link rod lying in a vertical plane that passes through the axis of the turbomachine, the other two link rods being positioned symmetrically on each side of this vertical plane.

The link rods may be substantially parallel to the axis of the turbomachine, thus making it possible to limit the axial movements of the combustion chamber and optimizing the positioning of the injectors relative to the chamber as the latter heats up in operation.

According to another feature of the invention, the link rods may comprise means, for example screw means, for adjusting length, allowing the position of the chamber to be optimized within the casings.

The link rods are advantageously connected to the outer wall of the chamber between fuel injectors so as to improve the precision with which the injectors are positioned relative to the chamber.

According to another feature of the invention, at least one of the walls that are the outer wall and the inner wall of the combustion chamber comprises at its downstream end a flexible piece for connecting to or resting against an outer or inner casing. The flexible connecting piece is welded or brazed to the chamber and rests substantially radially against a casing.

The use of flexible components makes it possible to limit the vibration at the chamber outlet during turbomachine operation. Such components can be made of materials that are lighter in weight than the flanges of the prior art because most of the mechanical work is performed by the suspension means upstream of the combustion chamber.

The downstream end of the inner wall of the chamber may be connected by a flexible annular flange to an inner casing.

In the case of an annular combustion chamber that converges toward the axis of the turbomachine, this can be mounted from the upstream end inside the outer casing.

BRIEF DESCRIPTION OF THE DRAWINGS

The invention will be better understood and other details, advantages and features of the invention will become apparent from reading the following description, which is given by way of nonlimiting example, with reference to the attached drawings in which.

DESCRIPTION OF THE PREFERRED EMBODIMENTS

Figure 1:
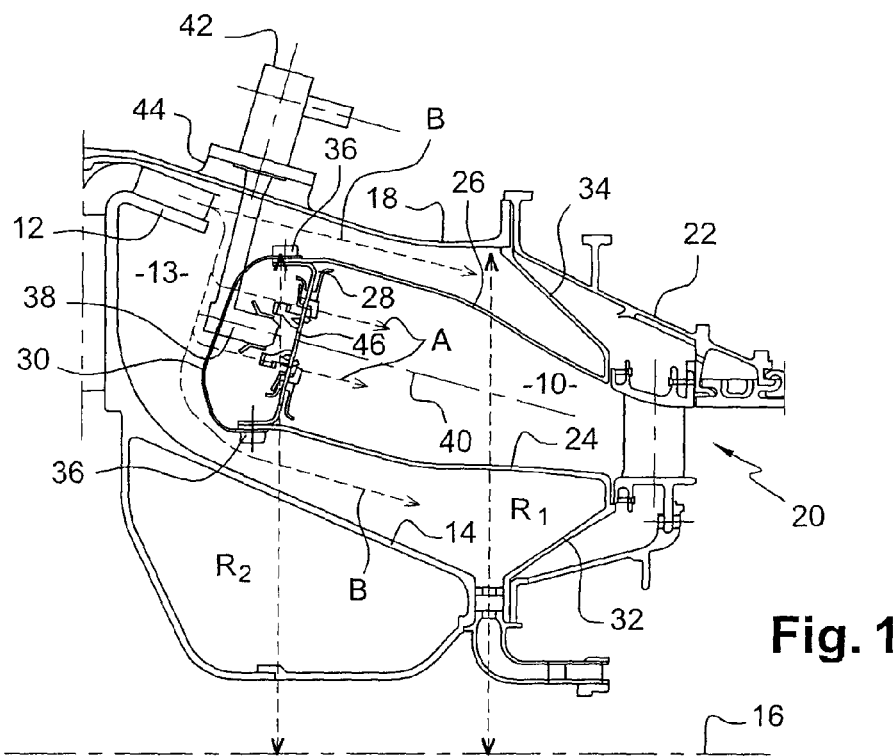
FIG. 1 is a schematic half view in axial section of a turbomachine combustion chamber according to the prior art.

Reference is made first of all to FIG. 1 which depicts a convergent annular combustion chamber 10 according to the prior art and in which a centrifugal diffuser 12, mounted on the outlet side of a high-pressure compressor (not depicted) supplies air to an annular space 13 delimited by two coaxial casings, one of them, 14, a radially inner casing with respect to the axis 16 of the turbomachine and the other of them, 18, a radially outer casing, and which contains the combustion chamber 10. This combustion chamber 10 is mounted upstream of a turbine section 20 surrounded by an outer casing 22 and comprises two, an inner 24 and an outer 26, substantially cylindrical and coaxial walls of revolution and an upstream annular chamber end wall 28 to which there is attached an annular cowling 30 which extends in the upstream direction. The downstream ends of the walls 24, 26 are connected to the casings 14 and 18 respectively by annular flanges 32 and 34. The upstream ends of the radially inner 24 and outer 26 walls of revolution are attached to radially inner and radially outer rims of the chamber end wall 28 and of the cowling 30, respectively, by bolts 36.

The chamber end wall 28 supports injector tips 38 which open into the combustion chamber 10 and which are directed along the axis 40 of this chamber 10. Each injector 38 extends through a hole in the cowling 30 and has a cranked part which fits around the upstream outer edge of the cowling 30 and is connected to fuel supply means 42 borne by the outer casing 18. These supply means 42 are attached to a boss 44 belonging to the outer casing 18.

During operation, the air flow provided by the high-pressure compressor and leaving the diffuser 12 is guided by the cowling 30 and splits into a part (arrows A) which passes through air inlet orifices in the cowling 30 and through corresponding holes 46 in the chamber end wall 28 to feed into the combustion chamber 10, and into two parts (arrows B) which bypass or flow around the combustion chamber 10.

In the known art, the combustion chamber 10 is mounted from the downstream end and is attached by its downstream flanges 32, 34 to the outer 18, 22 and inner 14 casings. When the chamber is a convergent chamber 10 as depicted in FIG. 1, it is not possible to insert the chamber between the inner 14 and outer 18 casings unless the downstream diameter of the outer casing 18 is increased so that the downstream diameter R1 of the outer casing 18 is greater than the diameter R2 of the chamber end wall 28 thus leading to an increase in mass, size and cost. This increase in diameter also introduces misalignment between the outer casings 18 and 22, thus disrupting the flow of air in the stream formed between the outer wall 26 and the outer casings 18, 22.

Upstream attachment of the combustion chamber, whether this be a divergent combustion chamber or a convergent combustion chamber, cannot be performed using a flange similar to the one used for downstream attachment. This is because attaching it in this way would assume the availability of a flange in the region bypassing the chamber 10, and the presence of such a flange would disrupt the air flow, and would entail attaching such a flange in the region of attachment of the injectors 38, something that could be achieved only with difficulty.

Figure 2:
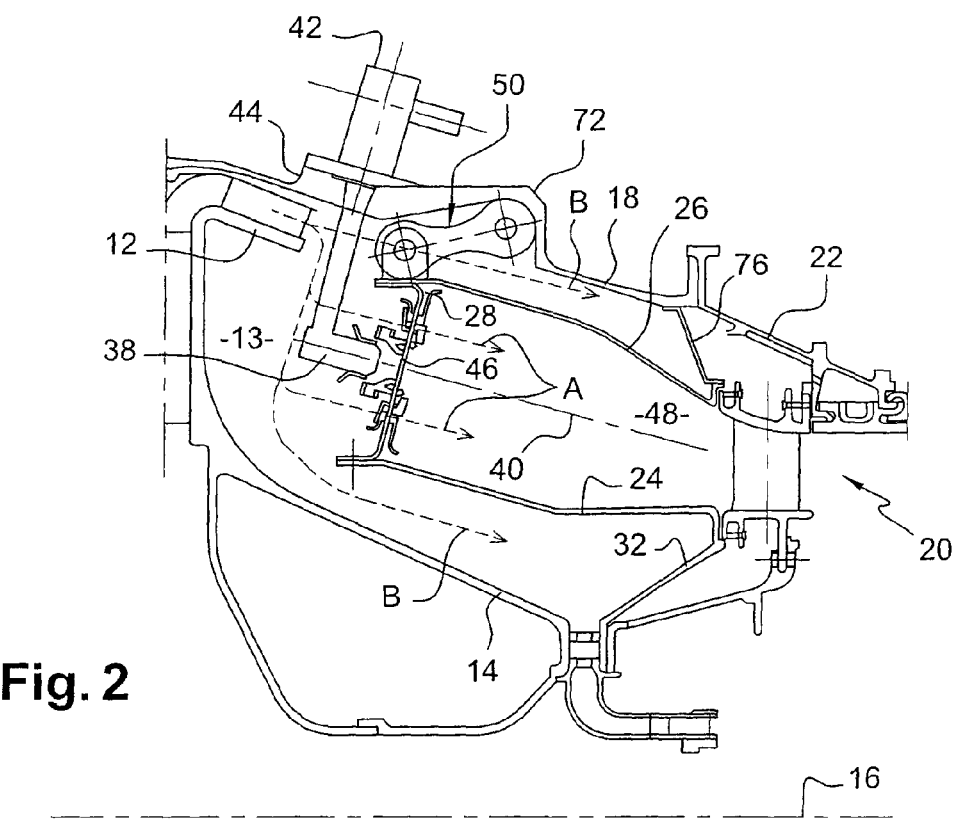
FIG. 2 is a schematic half view in axial section of a turbomachine combustion chamber according to the invention.

According to the invention, these disadvantages together with those already mentioned, are avoided by virtue of the fact that, as depicted in FIG. 2, the combustion chamber 48 is connected at its upstream end to the outer casing 18 by suspension means.

These suspension means comprise at least one link rod 50 lying in a plane that passes through the axis 16 of the turbomachine, the ends of the link rod being articulated to the outer wall 26 of the combustion chamber 48 and to the outer casing 18. The use of link rods 50 upstream of the chamber 48 makes it possible to reestablish alignment between the outer casings 18 and 22 thus allowing a considerable weight saving. In addition, the link rods 50 do not disrupt the flow of air (arrows B) bypassing the chamber 48.

Each link rod 50 comprises a hole 52 at each of its ends, and into each hole is inserted a ball swivel 54 comprising a bore and held in position in the hole 52 by rotating it through 90°.

Figure 3:
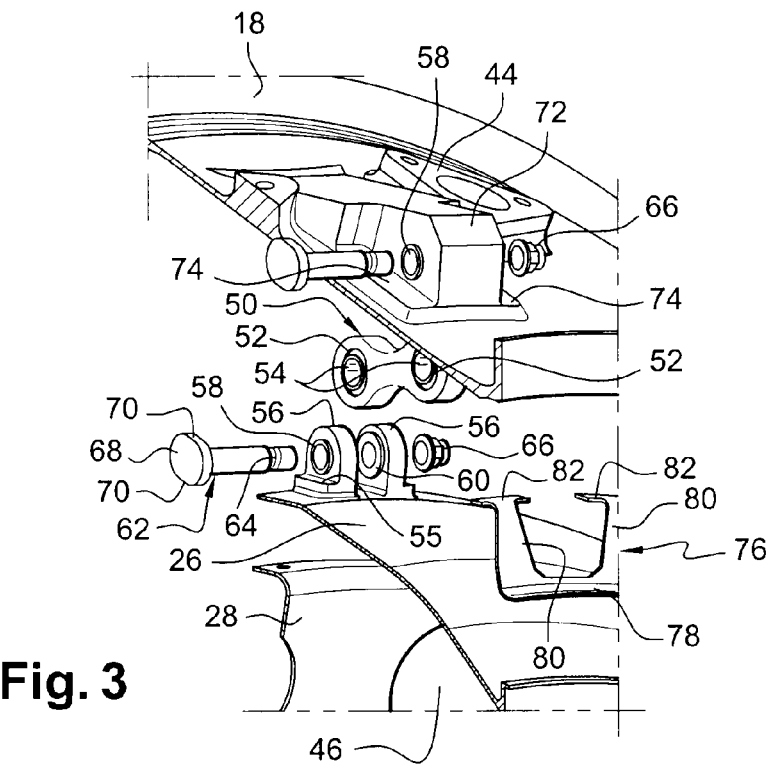
FIG. 3 is a schematic exploded view, in perspective viewed from the downstream end, of a system for suspending a combustion chamber according to the invention.
Figure 4:
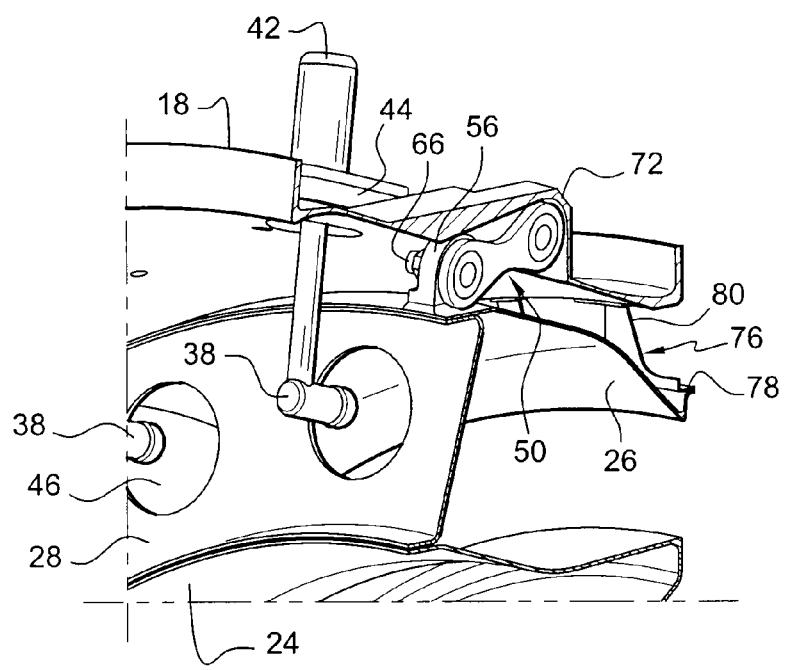
FIG. 4 is a schematic part view, in perspective from the upstream end, of part of a combustion chamber and of its suspension system according to the invention.

The upstream end of each link rod 50 is inserted between two clevises 56 belonging to the outer wall of revolution 26, which clevises run substantially radially (FIGS. 3 and 4). Each clevis 56 has a transverse hole aligned with the hole in the adjacent clevis 56 used for attaching the link rod 50. The radially inner part of each clevis comprises a flat-surfaced rim 55. A bushing 58 is mounted in each hole and is inset in such a way as to form a rim 60 on those faces of the clevises 56 that face one another. The link rod 50 is attached using a pin 62 inserted through the holes in the clevises 56 and the bore in the ball swivel 54 belonging to the link rod 50. The pin 62 has a threaded end 64 to take a fastening nut 66, the other end having a head 68 with two flats, one of which collaborates with the rim 55 of the clevis so as to prevent any rotation of the pin 62 and any unscrewing thereof while the turbomachine is in operation.

The downstream end of each link rod 50 is inserted in a boss 72 belonging to the outer casing, which boss projects outward and is L-shaped. The boss 72 has two coaxial holes into which bushings 58 are set in such a way as to form rims 60 on the inside of the boss 72. In a similar way to the clevises 56, the boss comprises flat parts 74, one of which is intended to engage with a flat 70 belonging to the threaded pin 62. A locknut 66 holds the threaded pin 62 in position in the holes in the boss 72 and the bore in the ball swivel 54 belonging to the link rod 50.

As depicted in FIG. 3, the boss 72 extends between two successive injectors 38, allowing the link rod 50 to be sited as close as possible to the injectors 38 in order to allow the injectors 38 to be positioned very precisely relative to the combustion chamber 48. It is thus possible to have good control over the penetration of the injectors 38 in order to optimize combustion of the fuel.

Figure 5:
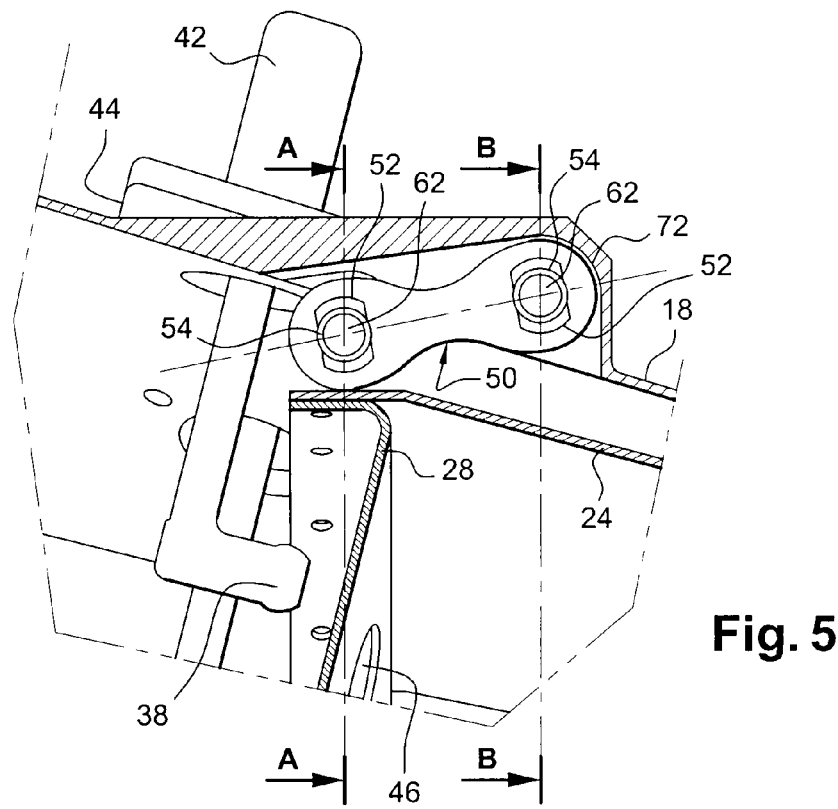
FIG. 5 is a schematic partial side view on a larger scale of the system for suspending a combustion chamber according to the invention.
Figure 6:
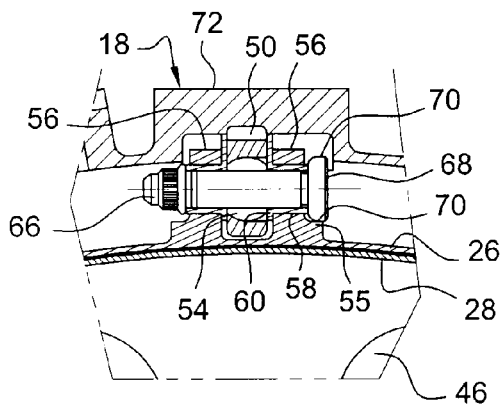
FIG. 6 is a view in section on A-A of the upstream part of the combustion chamber of FIG. 5.
Figure 7:
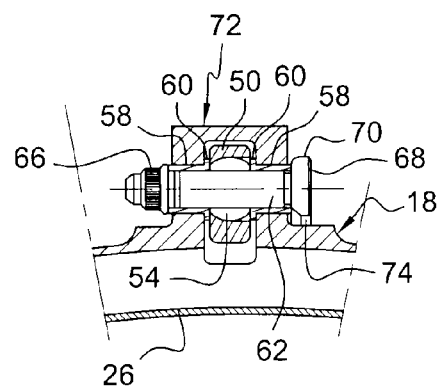
FIG. 7 is a view in section on B-B of the upstream part of the combustion chamber of FIG. 5.

The ball swivels 54 are immobilized on each side by the cramping skirts 60 of the bushings 58. These bushings 58 allow the pins 62 to be positioned very well in the holes. The bushings 58 belonging to the boss 72 also provide sealing against the air bypassing the combustion chamber 48 (FIGS. 5 to 7).

The link rod 50 is directed substantially parallel to the axis 16 of the turbomachine, thus making it possible to limit the movements of the combustion chamber 48 in the axial direction. The use of an articulated link rod 50 makes it possible to absorb the radial stresses applied during operation to the chamber 48.

Attaching the link rods 50 to the upstream end of the outer wall 26 that corresponds to the coolest region of the combustion chamber 48 limits the effect of thermal expansion of the chamber 48 on the clevises, thus making it possible to maintain alignment between the injectors 38 and the axis 40 of the chamber 48 and to optimize combustion of the fuel.

In order to limit vibration at the outlet from the chamber 48, a flexible piece 76 is mounted between the downstream end of the outer wall of revolution 26 and the outer casing 18. This piece 76 comprises an annular rim 78 at its inner end, welded or brazed to the outer wall 26, and branches 80 extending outward and connected at their outer ends to rims 82 resting against the inner surface of the outer casing 18.

When the turbomachine is not running, the flexible piece 76 is slightly prestressed between the outer wall of revolution 26 and the outer casing 18. When the turbomachine is running, the flexible piece 76 at least partially absorbs the vibration at the chamber outlet. The special shape of the flexible pieces 76, with disconnected outer ends, ensures permanent contact between the outer casing 18 and the outer wall 26.

In the embodiment depicted in the drawings, the inner wall of revolution 24 is connected to the inner casing 14 via an annular flange 32.

In an alternative form of the invention, the two, inner 24 and outer 26, walls of revolution are connected by flexible pieces 76 to the inner 14 and outer 18 casings respectively.

Figure 8:
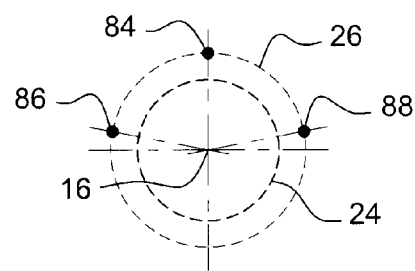
FIG. 8 is a schematic view in cross section of a combustion chamber showing the angular distribution of the link rods.

In one particular embodiment of the invention that is depicted in FIG. 8, the chamber is connected to the outer casing via three link rods 50 distributed about the upper half-circumference of the outer wall 26 of the chamber 48. One link rod 84 is positioned in a vertical plane passing through the axis 16 of the turbomachine, while the other two link rods 86, 88 are positioned symmetrically with respect to this vertical plane. The two symmetric link rods 86, 88 are approximately 80° from the link rod 84, so as to perform their suspension function optimally.

Advantageously, the link rods 50 may comprise length-adjustment screws so as to ensure an optimum fit of the chamber into the casing.

In an alternative form, the upstream attachment of the link rod 50 is onto the outer casing 18 and the downstream attachment of the link rod 50 is onto the outer wall 26 of the chamber 48.

The invention is particularly beneficial for use in a turbomachine with convergent combustion chamber so as to allow it to be inserted from the upstream end, but can also be used with a divergent combustion chamber in order to improve the precision with which the injectors can be positioned relative to the chamber.

The invention claimed is:

1. A turbomachine comprising an annular combustion chamber comprising:

a radially inner wall and a radially outer wall exhibiting symmetry of revolution with respect to the axis of the turbomachine;

an annular chamber end wall connected at upstream ends of the inner wall and the outer wall and equipped with fuel-injection means; and a suspension device which suspends the upstream end of the combustion chamber from an outer casing, wherein the suspension device includes at least one link rod articulated at a first end to the outer wall of the combustion chamber and at a second end to the outer casing, the first end of the link rod is articulated about a transverse axis on a first cylindrical pin mounted in a holes in a pair of clevises provided on the outer wall of the chamber and the second end of the link rod is articulated about the transverse axis on a second cylindrical pin mounted in holes provided in the outer casing, and the downstream end of the combustion chamber is connected to an inner casing or outer casing by flexible connections or mounts.

2. The turbomachine as claimed in claim 1, wherein the link rod lies in a plane that passes through the axis of the turbomachine.

3. The turbomachine as claimed in claim 1, wherein the first end of the link rod is articulated to the upstream end of the outer wall of revolution and the second end is housed and articulated in an outwardly projecting boss belonging to the outer casing.

4. The turbomachine as claimed in claim 3, wherein the boss includes a flat part and a head of the second cylindrical pin includes a flat which engages with the flat part.

5. The turbomachine as claimed in claim 1, wherein guide bushings are set into the holes in the clevises.

6. The turbomachine as claimed in claim 1, wherein the ends of the link rod are articulated on the cylindrical pins by ball swivels through which these pins pass.

7. The turbomachine as claimed in claim 1, and which comprises three link rods distributed over the upper half-circumference of the outer wall of the chamber, one link rod lying in a vertical plane that passes through the axis of the turbomachine, the other two link rods being positioned symmetrically on each side of this vertical plane.

8. The turbomachine as claimed in claim 1, wherein the link rod or each link rod is substantially parallel to the axis of the turbomachine.

9. The turbomachine as claimed in claim 1, wherein the link rod or each link rod comprises means for adjusting length.

10. The turbomachine as claimed in claim 1, wherein the link rod or each link rod is connected to the outer wall of the chamber between fuel injectors.

11. The turbomachine as claimed in claim 1, wherein at least one of the walls that are the outer wall and the inner wall of the chamber comprises at its downstream end a flexible piece for connecting to or resting against an outer or inner casing.

12. The turbomachine as claimed in claim 11, wherein the flexible connecting piece is welded or brazed to the chamber and rests substantially radially against a casing.

13. The turbomachine as claimed in claim 1, wherein the downstream end of the inner wall of the chamber is connected by a flexible annular flange to an inner casing.

14. The turbomachine as claimed in claim 1, wherein the annular combustion chamber is convergent and mounted from the upstream end inside the outer casing.

15. The turbomachine as claimed in claim 1, wherein a radially inner part of each clevis includes a flat-surfaced rim and a head of the first cylindrical pin includes a flat which collaborates with the rim to prevent rotation of the first cylindrical pin.

* * * * *